United States Patent

[11] 3,599,024

[72] Inventor Hiroyuki Kitamura
 Yokohama-shi, Japan
[21] Appl. No. 864,069
[22] Filed Oct. 6, 1969
[45] Patented Aug. 10, 1971
[73] Assignee Tokyo Shibaura Electric Co., Ltd.
 Kawasaki-shi, Japan
[32] Priority Oct. 8, 1968
[33] Japan
[31] 43/72848

[54] COMB-SHAPED POLE-TYPE DYNAMOELECTRIC MACHINES
 3 Claims, 4 Drawing Figs.
[52] U.S. Cl.................................................. 310/263,
 310/258
[51] Int. Cl. .................................................. H02k 1/22
[50] Field of Search............................................. 310/162,
 163, 165, 156, 158, 181, 258, 263, 48, 67

[56] References Cited
UNITED STATES PATENTS
2,802,959 8/1957 Powers........................ 310/156
3,012,161 12/1961 Puder.......................... 310/156
3,411,027 11/1968 Rosenberg................... 310/156
3,495,112 2/1970 Kurakin....................... 310/164
3,321,652 5/1967 Opel............................ 310/263
3,396,291 8/1968 Sommerville................ 310/263
FOREIGN PATENTS
228,877 1/1963 Austria....................... 310/263

Primary Examiner—Milton O. Hirshfield
Assistant Examiner—R. Skudy
Attorney—Irving M. Weiner ABSTRACT: In a comb-shaped pole-type dynamoelectric machine wherein magnetic flux produced by field coils mounted on the inner sides of end field yokes is passed to the rotor through an airgap, an annular axial projection is formed on the inside of each field yoke to form an additional airgap between it and the end portion of the rotor so as to pass magnetic flux to the rotor through said two airgaps in parallel whereby to utilize all cross-sectional area of the rotor thus reducing the diameter thereof.

3,599,024

COMB-SHAPED POLE-TYPE DYNAMOELECTRIC MACHINES

BACKGROUND OF THE INVENTION

This invention relates to an improved comb-shaped pole-type dynamoelectric machine having a large length to diameter ratio of the rotor.

The comb-shaped pole-type dynamoelectric machine, for example, the comb-shaped pole-type synchronous motor energized by a semiconductor inverter or switch is characterized by its easy maintenance because of the absence of brush so that it is valuable as a high-speed driving motor operating at a speed of leas than 3,000 r.p.m. for general industrial purposes.

However, since such a motor has a large moment of inertia it is impossible to use it in applications requiring quick response such as a control servomotor or a mill motor in a steel mill plant.

This is because the conventional comb-shaped pole-type dynamoelectric machine utilizes the rotor shaft as a portion of the magnetic circuit. This design requires the rotor shaft to have a sufficiently large diameter to pass all magnetic flux, thus increasing the diameter of the rotor and decreasing the core length of the rotor. For this reason, the core length to pole-spacing ratio is at most about 0.75, thus increasing the moment of inertia of the rotor.

SUMMARY OF THE INVENTION

It is therefore an object of this invention to provide an improved construction of the comb-shaped pole-type dynamoelectric machine capable of reducing the diameter of the rotor and hence the moment of inertia thereof.

Another object of the invention is to provide an improved comb-shaped pole-type dynamoelectric machine capable of providing sufficient mechanical strength to effect rotation of its rotor irrespective of its reduced diameter.

According to this invention, in a comb-shaped pole-type dynamoelectric machine comprising a stator mounted in a frame, a cylindrical rotor rotatably supported in the stator, the rotor including a pair of coaxial pole members disposed to face each other with their axial pole pieces interleaved with each other, field yokes enclosing the opposite ends of the frame, each field yoke surrounding the shaft of the rotor to form a first airgap therebetween and stationary field coils mounted on the inner side of the field yokes, there is provided an axial annular projection on the inner side of each field yoke to form an additional air gap between the annular projection and the end portion of the rotor whereby the magnetic flux produced by the field coil flows to the rotor through the first and additional air gaps in parallel to utilize all cross-sectional area of the rotor as the magnetic path.

In one embodiment of this invention each pole member is provided with a shaft portion of reduced diameter and the annular projection is disposed to surround the reduced diameter portion. The additional airgap is an axial airgap formed between one end surface of the rotor and the axially inner end of the annular projection.

According to a modified embodiment of this invention, the rotor is constructed as a cylindrical body having a uniform diameter throughout its length and an axial length substantially equal to the axial distance between inner sides of field yokes and each axial annular projection is formed to surround one end portion of the rotor to provide an additional radial airgap between them. Thus, the length of the end portion of the rotor is increased to increase its mechanical strength.

In either embodiment, as the entire cross-sectional area of the rotor is utilized as the flux path it is possible to greatly reduce the diameter of the rotor and hence the moment of inertia thereof.

DESCRIPTION OF THE PREFERRED EMBODIMENTS

Figure 1:
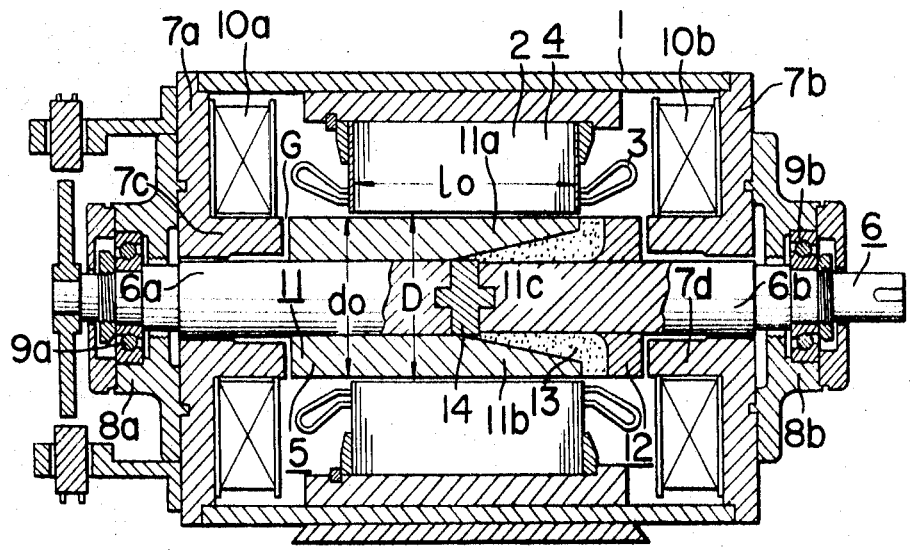
FIG. 1 shows a longitudinal section of a comb-shaped pole-type dynamoelectric machine embodying this invention.

As shown in FIG. 1 a torodial stator core 2 is secured on the inner wall of a cylindrical frame or housing 1 and an armature winding 3 is wound in the slots of the stator core 2 to form a stator 4. The bore of the stator core rotatably receives a rotor 5, the opposite ends of the rotor shaft 6 extending through housing end walls which also function as field yokes 7a and 7b secured to the opposite ends of the frame 1. The shaft 6 is rotatably journaled by bearings 9a and 9b in bearing brackets 8a and 8b secured to the outer surfaces of field yokes 7a and 7b. Annular axial flanges 7c and 7d having substantially the same outer diameter as the rotor 5 are provided on the inner end of field yokes 7a and 7b to surround shaft 6 with small air gaps therebetween. Field coils 10a and 10b are wound around annular flanges 7c and 7d.

The rotor 5 comprises a pair of opposing magnetic pole members 11 and 12, comb-shaped pole pieces thereof 11a, 11b, 12a, and 12b (pole pieces 12a and 12b are not shown in the drawing) being meshed with each other with small spacings therebetween. Pole members 11 and 12 are shrink fitted on rotor shaft 6 and are welded thereto. The gap between pole members 11 and 12 is filled with a nonmagnetic material 13, die cast aluminum for example. The rotor shaft 6 comprises two magnetic coaxial sections 6a and 6b which are connected together by a nonmagnetic intermediate shaft or connector 14. Magnetic pole members 11 and 12 are magnetically and mechanically connected to shaft sections 6a and 6b, respectively.

Figure 2:
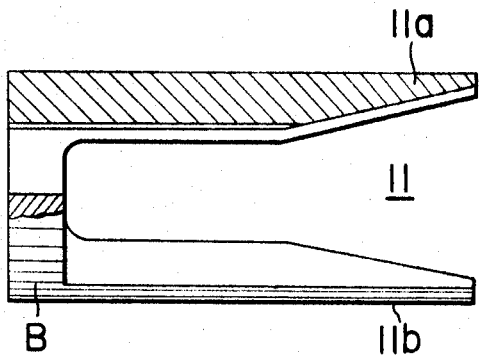
FIG. 2 shows a side view, partly in section, of comb-shaped pole cylinder.
Figure 3:
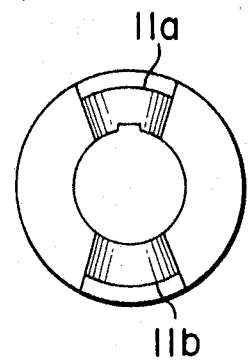
FIG. 3 is a front view of a pole cylinder shown in FIG. 2.

As shown in FIGS. 2 and 3, each of the magnetic members has a cylindrical or annular base portion B and two diametrically opposed axial pole pieces 11a and 11b of sector cross section. The base portion B should be continuous in the circumferential direction to provide a magnetic path of sufficient cross-sectional area thus assuring sufficient magnetic flux across the main airgaps between pole pieces. Otherwise excessive eddy current loss would result at the ends of the rotor due to spacial fluctuation of the magnetic flux at the ends of the rotor, which greatly decreases the output of the dynamoelectric machine.

As shown in FIG. 1 the inner ends of annular flanges or projections 7c and 7d of field yokes 7a and 7b are confronting to end surfaces of pole members 11 and 12 with their comb-shaped pole pieces interleaved with small airgaps therebetween.

This embodiment shows a four pole synchronous motor to be operated by a semiconductor inverter and has a rating of 150 kw. and 1,500 r.p.m. The axial length $l_0$ of the stator core 2 is 70 mm., the inner diameter of the bore in the stator core is 44 mm. and has pole spacing $\tau_0 = 35$ mm.

In operation, the flux flows from pole piece 11a, across the airgap between stator 4 and rotor 5, through stator core 2 in the circumferential direction, again across the airgap into pole piece 12a of the adjacent pole member 12, through shaft section 6b and annular flange 7d in parallel, through field yoke 7b, frame 1 and field yoke 7a and through annular flange 7c back to the pole member 11 of the rotor 5. Flux also flows from field yoke 7a through shaft section in parallel with annular projection 7c. In this manner, it is possible to utilize all cross-sectional area $\frac{1}{4}\pi d_0^2$ of the rotor including its axis as the magnetic path, thus producing sufficient quantity of flux across airgaps G.

In the above-described embodiment it was possible to create a flux density Bg $= 0.60$ $wb/m^2$ in the airgap. (The flux density in field yokes $7a$ and $7b$ was equal to 1.45 $wb/m^2$). Thus, sufficient quantity of flux can be supplied to the rotor 5 through annular projections $7c$ and $7d$ and shaft sections $6a$ and $6b$ in parallel. On the contrary, according to the prior construction only the shaft portion extending through the field yoke is utilized as the magnetic path in the rotor so that only a portion of the cross-sectional area $¼\pi d_0{}^2$ of the rotor is utilized as the magnetic circuit. When compared with this prior construction, in the motor embodying this invention it is possible to reduce the diameter of the shaft sections $6a$ and $6b$. In other words, it is possible to reduce the diameter $d_0$ of the rotor. As a result, it is possible to increase the core length $l_0$ of the stator with reference to the diameter $d_0$ of the rotor, thus decreasing its moment of inertia.

Where the ratio $l_0 / \tau_0$ between core length $l_0$ and pole spacing $\tau_0$ is selected to be more than two, the rotor shaft, field yokes and comb shaped pole pieces may be made of a material such as Perminjoule or pure iron having a flux density of higher than 2 $wb/m^2$ and a small magnetomotive force. Since the width of the airgap G between the rotor and the field yoke is varied in accordance with end play and the accuracy of machining it is advantageous to arrange the airgap in parallel with the axis of the rotation of the rotor as will be discussed later in connection with a modified embodiment of this invention. Thus, in accordance with this invention as the outer diameter of the annular flanges or axial projections of the field yokes are made to be equal to the outer diameter of the rotor and since the rotor is constructed to have uniform diameter throughout its length sufficient quantity of magnetic flux is caused to flow through small airgaps between end surfaces of the field yokes and the end surfaces of the rotor whereby all cross-sectional area $¼\pi d_0{}^2$ of the rotor can be utilized as the flux path. Thus, when compared with the prior art design wherein only the rotor shaft is utilized as the flux path it becomes possible to decrease the outer diameter of the rotor and hence the inner diameter of the stator bore with respect to the stator core length. Accordingly, it is possible to greatly decrease the moment of inertia of the rotor which is an advantageous feature to control servomotors which are required to have low moment of inertia. If the core length is doubled the output of the comb-shaped pole-type dynamoelectric machine could also be doubled.

As above-described, while the construction of the aforementioned embodiment is suitable for decreasing the moment of inertia of the machine the axial length of end portions of pole members (base B in FIG. 2) is not sufficiently large to assure high mechanical strength.

According to a modified embodiment, the rotor is constructed as a cylindrical body of uniform diameter having an axial length substantially equal to the axial distance between inner sides of field yokes and an axial annular projection is formed to surround one end portion of the rotor to provide an additional radial airgap between them. Thus the length of the end portions of the rotor is increased to increase its mechanical strength.

Figure 4:
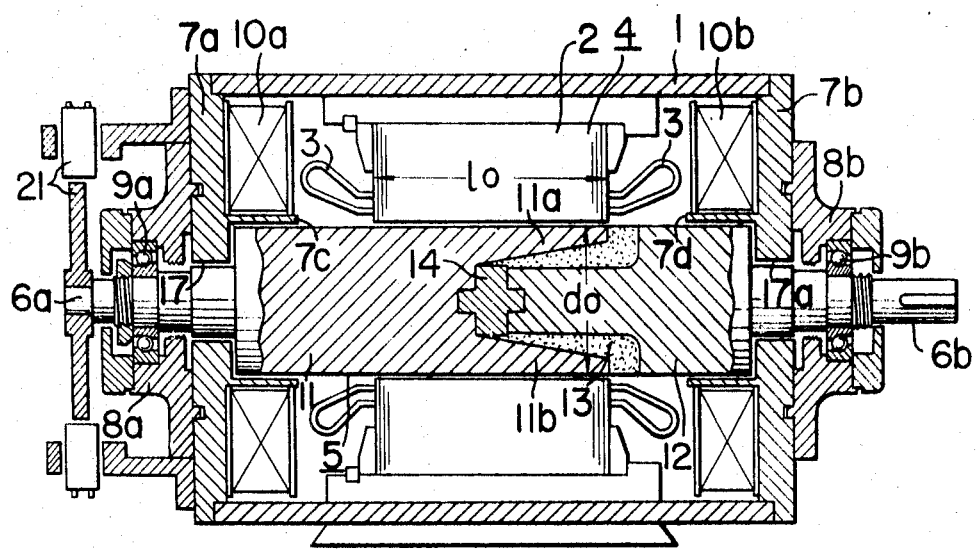
FIG. 4 shows a longitudinal section of a modified comb-shaped pole-type dynamoelectric machine of this invention.

Referring now to FIG. 4 in which corresponding portions of the machine are designated by the same reference numerals as the previous embodiment, again the rotor 5 is comprised by two pole members 11 and 12 each having two pole pieces $11a$, $11b$ and $12a$, $12b$ which are interleaved each other. In this embodiment, however, the inner diameter of annular flanges $7c$ and $7d$ of field yokes $7a$ and $7b$ is increased to that of the bore in the stator 2 so as to receive end portions of role members 11 and 12. In other words, the axial length of the rotor 5 is increased to substantially the axial distance between inner surfaces of field yokes $7a$ and $7b$. Radial gaps between the inner surfaces of annular flanges $7c$ and $7d$ and end portions of pole members or rotor act as the main airgaps. These main airgaps correspond to gaps G shown in FIG. 1 but pass magnetic flux in the radial direction instead of axial direction. The rotor is provided with shafts $6a$ and $6b$ of reduced diameter and journaled by bearings $9a$ and $9b$, respectively.

Airgaps 17 and $17a$ serve as the auxiliary airgaps. In this case, shafts $6a$ and $6b$ are integral with pole members 11 and 12 and the connection between these pole members is provided by a nonmagnetic intermediate shaft 14 interposed therebetween. A suitable position or speed detector 21 may be associated with shaft $6a$ to control the speed of the motor. Where the motor is energized by a semiconductor inverter, not shown, the signal from the detector 21 may be utilized to control the speed of the motor.

Again, all cross-sectional area of the rotor is utilized as the flux path so that it is possible to reduce the diameter of the rotor. In this embodiment, as the axial length of end portions of pole members (corresponding to base portion B in FIG. 2) is sufficiently large the mechanical strength of the rotor can be increased.

I claim:

1. In a dynamoelectric machine, a stationary housing of magnetic material including opposite end walls, a torodial stator core having a field winding thereon and affixed to and within said housing, a pair of magnetic tubular extensions respectively on said end walls coaxially with the axis of said stator, said extensions terminating in annular surfaces axially spaced outwardly from said core, a rotatable magnetic shaft extending through said core and said extensions coaxially thereof, a nonmagnetic connector interposed in said shaft to magnetically divide the shaft into two sections, one of said sections having a flux gap with one of said extensions and the other of said sections having a flux gap with the other of said extensions, a magnetic pole member affixed onto one of said shaft sections having a gap with said stator core and another gap with said annular surface of one of said extensions, the outer diameter of said magnetic pole member being almost the same as that of a pair of said extensions, and another pole member having a gap with said stator core and another gap with the annular surface of the other of said extensions, a magnetic flux insulator between and insulating said pole members from each other, each of said pole members is provided with a shaft portion of reduced diameter and said annular projection is provided to surround said shaft portion to form a radial airgap therebetween and an axial airgap between the end surface of said rotor and said annular projection, and each of said pole members is hollow and said shaft portion of reduced diameter extends through said hollow pole member and is connected thereto.

2. The dynamoelectric machine according to claim 1 wherein said rotor is a cylindrical body of uniform diameter and having an axial length substantially equal to the axial distance between inner surface of said field yokes and wherein said annular projections surround the end portions of said rotor to form radial airgaps therebetween.

3. The dynamoelectric machine according to claim 2 wherein each end portion of said rotor is provided with an integral shaft portion of reduced diameter which is surrounded by the radially inner end of said field yoke to form said first air gap.